United States Patent
McElvain

(10) Patent No.: US 7,236,267 B2
(45) Date of Patent: Jun. 26, 2007

(54) METHOD FOR MERGING RENDERING INTENTS, HINTS, OR TAGS

(75) Inventor: Jon S. McElvain, Redondo Beach, CA (US)

(73) Assignee: Xerox Corporation, Stamford, CT (US)

( * ) Notice: Subject to any disclaimer, the term of this patent is extended or adjusted under 35 U.S.C. 154(b) by 973 days.

(21) Appl. No.: 10/607,941

(22) Filed: Jun. 27, 2003

(65) Prior Publication Data

US 2004/0263877 A1    Dec. 30, 2004

(51) Int. Cl.
*G06F 15/00* (2006.01)

(52) U.S. Cl. .................... 358/1.9; 358/1.2; 358/2.1

(58) Field of Classification Search ........... 358/1.9, 358/1.2, 1.1, 2.1, 3.03, 3.04, 3.06, 3.07, 3.08, 358/3.09, 3.1, 3.3, 1.15, 518, 521, 525, 533, 358/534, 535, 536; 382/162, 167, 254, 260–269, 382/299, 298, 300
See application file for complete search history.

(56) References Cited

U.S. PATENT DOCUMENTS

| | | | |
|---|---|---|---|
| 5,687,303 A | 11/1997 | Motamed et al. | 358/1.18 |
| 6,006,013 A | 12/1999 | Rumph et al. | 358/1.15 |
| 6,256,104 B1 | 7/2001 | Rumph et al. | 358/1.15 |
| 6,327,043 B1 | 12/2001 | Rumph et al. | 358/1.15 |
| 6,493,463 B1 * | 12/2002 | Nagarajan et al. | 382/173 |
| 6,516,091 B1 * | 2/2003 | Nagarajan et al. | 382/173 |
| 6,636,331 B1 * | 10/2003 | Nagarajan et al. | 358/2.1 |
| 6,639,692 B1 * | 10/2003 | Li et al. | 358/2.1 |
| 6,650,439 B1 * | 11/2003 | Nagarajan et al. | 358/2.1 |
| 7,039,232 B2 * | 5/2006 | Nagarajan et al. | 382/173 |

* cited by examiner

*Primary Examiner*—Dov Popovici
(74) *Attorney, Agent, or Firm*—Jeannette Walder

(57) ABSTRACT

A method for selecting which rendering hint or tag to use when multiple tags may be associated with a pixel, includes prioritizing the set of input tags associated with an input image, such that each input tag has a unique priority relative to other input tags in the set; filtering the input image by selecting groups of input pixels, applying a filtering function to the contone data associated with each selected group of input pixels, and producing an output pixel having an output contone data for each selected group of input pixels; for each selected group of input pixels, comparing the priorities of the input tags associated with the selected group of input pixels and selecting as the output tag associated with the output pixel, that tag with the highest priority.

20 Claims, No Drawings

METHOD FOR MERGING RENDERING INTENTS, HINTS, OR TAGS

FIELD OF THE INVENTION

This invention relates generally to digital image processing systems, and more particularly to a method for selecting which rendering hint or tag to use when multiple tags may be associated with a pixel.

BACKGROUND OF THE INVENTION

In digital image processing systems, each pixel is typically represented by a numeric value specifying the color of that element. These contone (color) pixel levels are generally continuous from one pixel to another. In some systems however, there are additional numeric values called "tags" associated with each pixel, which may describe how the pixel is to be rendered. For example, these tags (known also as "rendering intents" or "rendering hints") may specify to the rendering stage which halftone is to be used for a printing application. In contrast to the contone (color) pixel levels, where color values are continuous, adjacent tag values are in general not related. For example one pixel on the border of one object may have a tag value of 5 (150 cluster dot) associated with it. An adjacent pixel, which is associated with another type of object may have a tag value of 6 (300 line screen). The tag values of 5 and 6 are close, but the rendering hint they each refer to provide significantly different rendering outputs.

If the digital image processing system produces the image in its original format, i.e., including all pixels, each pixel is rendered according to the correct tag. However, in some applications, it may be necessary to filter the original image prior to rendering. For example, a user may wish to print a "draft" version or lower resolution version or a user may wish to print a monochrome version rather than a full color version, etc. General filtering (when an image is being reduced in resolution or size, for example) involving the contone data is very straightforward, as the final pixel color is simply a weighted sum of the surrounding pixel color values. However, filtering of the tag data plane presents a far more difficult problem, due to the lack of correlation between tag levels. Applying a weighted sum of the surrounding pixel tags may not produce a clear answer if there are tag values of 5 and 6 present in the filtering window. If there are tag values of 1 and 9 in the filter window, an entirely inappropriate tag may be chosen.

SUMMARY OF THE INVENTION

A method for selecting which rendering hint or tag to use when multiple tags may be associated with a pixel, according to one aspect of the invention, includes providing an original image comprising a plurality of input pixels, wherein each input pixel has input contone data associated with it and an input tag associated with it, wherein the original image has a predetermined set of input tags associated with it; prioritizing the predetermined set of input tags, such that each input tag has a unique priority relative to other input tags in the set; filtering the original image by selecting groups of input pixels, applying a filtering function to the contone data associated with each selected group of input pixels, and producing an output pixel having an output contone data for each selected group of input pixels; and for each selected group of input pixels, comparing the priorities of the input tags associated with the selected group of input pixels and selecting as the output tag associated with the output pixel, that tag with the highest priority.

In accordance with another aspect of the invention (i.e., one which processes only tags and not contone data), a method for selecting which rendering hint or tag to use when multiple input tags are used to create a single output tag, comprising: providing an original image comprising a plurality of input pixels, wherein each input pixel has an input tag associated with it, wherein the original image has a predetermined set of input tags associated with it; prioritizing the predetermined set of input tags, such that each input tag has a unique priority relative to other input tags in the set; for each selected group of input pixels, comparing the priorities of the input tags associated with the selected group of input pixels and selecting as the output tag associated with the output pixel, that tag with the highest priority.

The selected group of input pixels may be at least two adjacent pixels. Alternatively, selected windows of pixels may be used, for example a 2 by 2 window of four pixels, a 3 by 3 window, a 10 by 10 window. Pixels in the selected window will in most cases be adjacent, however, in some applications, it may be useful to look at pixels outside the selected group or to only consider a subset of the adjacent pixels within the selected group. The filtering function which filters the contone data may be any type of filter, such as a box filter or a gaussian filter.

In accordance with another aspect of the method, the tag merge function, for each selected group of input pixels, may further include applying a weighting function to the input tags associated with the selected group of input pixels, and for each input tag computing a score comprising the product of the weighting function and the priority for that input tag, and selecting as the output tag associated with the output pixel, that tag with the highest score. The contone filtering function may include a plurality of filtering coefficients and the weighting function may include the plurality of filtering coefficients. The weighting function may also include the number of input pixels having the same tag within the selected group.

If an input pixel has more than one tag associated with it (for example, there may be families of tags associated with each pixel color tags, moiré tags, contour tags and gradation tags), the method may be applied to each type of tag in order to select an appropriate tag for each tag type.

The method may be used to merge rendering intents in an anti-aliasing filter from 1200 dpi to 600 dpi. It can also be used in other tag-specific applications, for example interpolation of the tag channel in a printer with a "half-res" mode.

DETAILED DESCRIPTION OF THE PREFERRED EMBODIMENTS

Digital image processing systems generally represent pixel values as numbers that correspond to the color of that pixel. A simplified example of such a representation is shown below in Table 1 a, where the pixel values refer to darkness (0-255). Each level of darkness is related to the surrounding levels, making filtering operations on this data straightforward: the filtered (output) value for each pixel is a weighted sum of the surrounding pixel values. For example, applying a 3×3 box filter to the contone data shown in Table 1a results in an image having pixels values shown in Table 1b that is similar to the original.

TABLE 1a

| 0 | 0 | 0 | 0 |
|---|---|---|---|
| 0 | 0 | 0 | 0 |
| 210 | 210 | 210 | 210 |
| 210 | 210 | 210 | 210 |

TABLE 1b

| 0 | 0 | 0 | 0 |
|---|---|---|---|
| 70 | 70 | 70 | 70 |
| 140 | 140 | 140 | 140 |
| 210 | 210 | 210 | 210 |

Table 1a is a gray level presentation of contone image data, where increasing values correspond to increasing darkness. In Table 1b, after application of a 3×3 box filter results in an image that is similar to the original.

In some systems, there are additional image "tags" (also known as "intents" or "hints") that are associated with each pixel. These tags describe how the pixel is to be rendered. For example, in printing systems, this tag may refer to the halftone used for rendering. In general, adjacent tags are not related, so continuity is not present as it is with the contone data. Exemplary tags are shown below:

| Function | Tag Value |
|---|---|
| 75 Cluster Dot | 0 |
| 100 Cluster Dot | 1 |
| 50 Line Screen | 2 |
| 150 Cluster Dot | 3 |
| 175 Cluster Dot | 4 |
| 75 Line Screen | 5 |
| 50 Cluster Dot | 6 |
| 600 Line Screen | 7 |
| 300 Cluster Dot | 8 |
| 200 Line Screen | 9 |
| 300 Line screen | 10 |

The pixels with contone data values shown in Table 1a may have associated tag values as shown in Table 2a. Applying the same filtering to the tag plane as was performed in Table 1b leads to disastrous results (Table 2b)—"averaged" tag values which force rendering with completely different screens.

TABLE 2a

| 0 | 0 | 0 | 0 |
|---|---|---|---|
| 0 | 0 | 0 | 0 |
| 9 | 9 | 9 | 9 |
| 9 | 9 | 9 | 9 |

TABLE 2b

| 0 | 0 | 0 | 0 |
|---|---|---|---|
| 3 | 3 | 3 | 3 |
| 6 | 6 | 6 | 6 |
| 9 | 9 | 9 | 9 |

In Table 2a, tag values correspond to the pixels in Table 1a. Table 2b illustrates the result of filtering the tag values of Table 1a using the same 3×3 box filtering as that for the contone pixels. The softened edges (70, 140) in the contone data of Table 1b would be rendered with the 50 or 150 cluster dot screens, whereas the rest would be rendered using the 200 line screen, creating severe image quality artifacts.

The method of the invention solves these problems and employs a tag merge function:

$$T^{out} = F(T_0^{in}, T_1^{in}, T_2^{in}, \ldots, w_0, w_1, w_2, \ldots)$$

where $T_i^{in}$ are the input tags, and $w_i$ are the corresponding weights. The weights may be different, as in the case of a bilinear/bicubic interpolator, or they may be equal, as in the case of a box filter or in the simplest case, they may be unity. The only requirement for this function is the output tag must be one of the input tags.

For example, the tag merge module may include a merge function which is a score-based system. A priority table may be established by the user. Priority may be determined in a variety of manners depending on the user's applications. For example, one priority table may include defining priority by assigning the tag value associated with the largest number of pixels associated with the highest priority. Another priority table may prioritize tags according to a desired output rendering. For example, one priority table may be prioritized to favor tags which enhance edge rendering around text. However, in any priority table, no two tag values can receive the same priority. An exemplary priority table is shown in Table 3.

TABLE 3

| Tag Value | Function | Priority |
|---|---|---|
| 0 | 75 Cluster Dot | 10 |
| 1 | 100 Cluster Dot | 1 |
| 2 | 50 Line Screen | 3 |
| 3 | 150 Cluster Dot | 8 |
| 4 | 175 Cluster Dot | 15 |
| 5 | 75 Line Screen | 9 |
| 6 | 50 Cluster Dot | 6 |
| 7 | 600 Line Screen | 12 |
| 8 | 300 Cluster Dot | 2 |
| 9 | 200 Line Screen | 5 |
| 10 | 300 Line Screen | 7 |

Referring back to the example of an input image which is filtered by a 3×3 box filter. In this case, blocks of 9 input pixels are averaged to produce one output pixel. In the case of the contone data, 9 input pixel values are averaged to provide the contone data for the single output pixel. The output tag is determined by examining the tags of the 9 input pixels. The priority of each input pixel is determined. In the simplest form of the tag merge function, the output tag is simply the tag with the highest priority. In accordance with another form of the tag merge function, the output tag which is repeated the most times in the block of 9 pixels. For example, if the block of 9 pixels contains five pixels with tag value 5 and four pixels with tag value 6, the output pixels will be provided a tag value of 5.

In accordance with another form of the tag merge function, for each input tag value, the priority is multiplied by a weight, to create a "score" for that tag. For degenerate tag inputs, the weights may be combined prior to computation of the score. Once the score is computed, the tag with the highest score is that which is assigned to the output tag. In the Table 4, the output would receive a tag value of 5. In the rare case where identical scores are computed for two different tags, the algorithm may chose the tag with the higher priority as specified in the priority table.

TABLE 4

| Tag Value | Function | Priority | Input Tag Weight | Score |
|---|---|---|---|---|
| 0 | 75 Cluster Dot | 10 | 0 | 0 |
| 1 | 100 Cluster Dot | 1 | 0 | 0 |
| 2 | 50 Line Screen | 3 | 0.1 | 0.3 |
| 3 | 150 Cluster Dot | 8 | 0 | 0 |
| 4 | 175 Cluster Dot | 15 | 0 | 0 |
| 5 | 75 Line Screen | 9 | 0.4 | 3.6 |
| 6 | 50 Cluster Dot | 6 | 0 | 0 |
| 7 | 600 Line Screen | 12 | 0.2 | 2.4 |
| 8 | 300 Cluster Dot | 2 | 0 | 0 |
| 9 | 200 Line Screen | 5 | 0 | 0 |
| 10 | 300 Line Screen | 7 | 0.3 | 2.1 |

In the example of Table 4, each tag has a different weight coefficient. As noted before, the weight coefficients may be the same as those of the filtering function, which filters the contone data portion of the input pixels. Note that tag value 5 had a priority of 9 and a weight of 0.4. Tag value 4 (with a priority of 15) was not present in this particular group of input pixels.

This method can be extended in the case of bit field tags, or "rendering intents" where a multiple bit value is partitioned and used to represent several tag "families". Each family is assumed to be independent (orthogonal) relative to the other families:

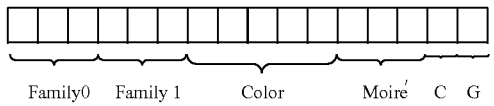

Family0   Family 1   Color   Moiré   C   G where C is Contour and G is Gradation. The number of bits consumed by each family is determined by the total number of fields in that family. For example, the "Contour" family may only have two states (yes, no) and will consume only one bit, whereas the "Color" family may have 30 fields and will consume 5 bits.

When multiple intents are to be merged, each family is merged independently according to the tag merge method described above. The final intent is then obtained by ORing the merge result of each of these families.

The method described above may be used to merge rendering intents in an anti-aliasing filter, where run length encoded data (containing color and rendering intent information) originally at a high resolution (e.g., 1200 dpi) are reduced to the IOT resolution (e.g., 600 dpi). The method may also be used in the case where pixel hints (i.e., a separate map containing tags for each pixel) exist and some filtering operation needs to be performed on the image data, for example in a "half resolution" mode, where data (contone and tags) are stored in a compressed form at a lower resolution (e.g., 300 dpi), and later subjected to interpolation in order to scale up to printer resolution (e.g., 600 dpi).

The invention has been described with reference to particular embodiments for convenience only. Modifications and alterations will occur to others upon reading and understanding this specification taken together with the drawings. The embodiments are but examples, and various alternatives, modifications, variations or improvements may be made by those skilled in the art from this teaching which are intended to be encompassed by the following claims.

What is claimed is:

1. A method for selecting which rendering hint or tag to use when multiple input tags are used to create a single output tag, comprising:
   providing an original image comprising a plurality of input pixels, wherein each input pixel has input contone data associated with it and an input tag associated with it, wherein the original image has a predetermined set of input tags associated with it;
   prioritizing the predetermined set of input tags, such that each input tag has a unique priority relative to other input tags in the set;
   filtering the original image by selecting groups of input pixels, applying a filtering function to the contone data associated with each selected group of input pixels, and producing an output pixel having an output contone data for each selected group of input pixels;
   for each selected group of input pixels, comparing the priorities of the input tags associated with the selected group of input pixels and selecting as the output tag associated with the output pixel, that tag with the highest priority.

2. The method of claim 1, wherein each selected group of input pixels comprises a selected group of adjacent input pixels.

3. The method of claim 1, wherein each selected group of input pixels comprises at least two adjacent input pixels.

4. The method of claim 1, wherein each selected group of input pixels comprises at least four adjacent input pixels.

5. The method of claim 1, wherein the filtering function comprises a box filter.

6. The method of claim 1, for each selected group of input pixels, further comprising: applying a weighting function to the input tags associated with the selected group of input pixels, and for each input tag computing a score comprising the product of the weighting function and the priority for that input tag, and selecting as the output tag associated with the output pixel, that tag with the highest score.

7. The method of claim 6, wherein the filtering function comprises a plurality of filtering coefficients and wherein the weighting function comprises the plurality of filtering coefficients.

8. The method of claim 6, wherein the weighting function comprises the number of input pixels having the same tag.

9. The method of claim 1, wherein each input pixel has a plurality of input tag families associated with it, and further comprising for each selected group of input pixels, for each input tag family, comparing the priorities of the input tags associated with the selected group of input pixels and selecting as the output tag for that tag family associated with the output pixel, that tag with the highest priority.

10. The method of claim 9, wherein the plurality of input tag families comprises color tags, moiré tags, contour tags and gradation tags.

11. The method of claim 10, wherein the color family comprises up to 32 different tags, the moiré family comprises up to 8 tags, the contour family comprises up to 2 tags and the gradation family comprises up to 2 tags.

12. A method for selecting which rendering hint or tag to use when multiple input tags are used to create a single output tag, comprising:
   providing an original image comprising a plurality of input pixels, wherein each input pixel has an input tag associated with it, wherein the original image has a predetermined set of input tags associated with it;

prioritizing the predetermined set of input tags, such that each input tag has a unique priority relative to other input tags in the set;

for each selected group of input pixels, comparing the priorities of the input tags associated with the selected group of input pixels and selecting as the output tag associated with the output pixel, that tag with the highest priority.

13. The method of claim 12, wherein each selected group of input pixels comprises a selected group of adjacent input pixels.

14. The method of claim 12, wherein each selected group of input pixels comprises at least two adjacent input pixels.

15. The method of claim 12, wherein each selected group of input pixels comprises at least four adjacent input pixels.

16. The method of claim 12, for each selected group of input pixels, further comprising: applying a weighting function to the input tags associated with the selected group of input pixels, and for each input tag computing a score comprising the product of the weighting function and the priority for that input tag, and selecting as the output tag associated with the output pixel, that tag with the highest score.

17. The method of claim 16, wherein the weighting function comprises the number of input pixels having the same tag.

18. The method of claim 12, wherein each input pixel has a plurality of input tag families associated with it, and further comprising for each selected group of input pixels, for each input tag family, comparing the priorities of the input tags associated with the selected group of input pixels and selecting as the output tag for that tag family associated with the output pixel, that tag with the highest priority.

19. The method of claim 18, wherein the plurality of input tag families comprises color tags, moiré tags, contour tags and gradation tags.

20. The method of claim 19, wherein the color family comprises up to 32 different tags, the moiré family comprises up to 8 tags, the contour family comprises up to 2 tags and the gradation family comprises up to 2 tags.

* * * * *